Figure 1:
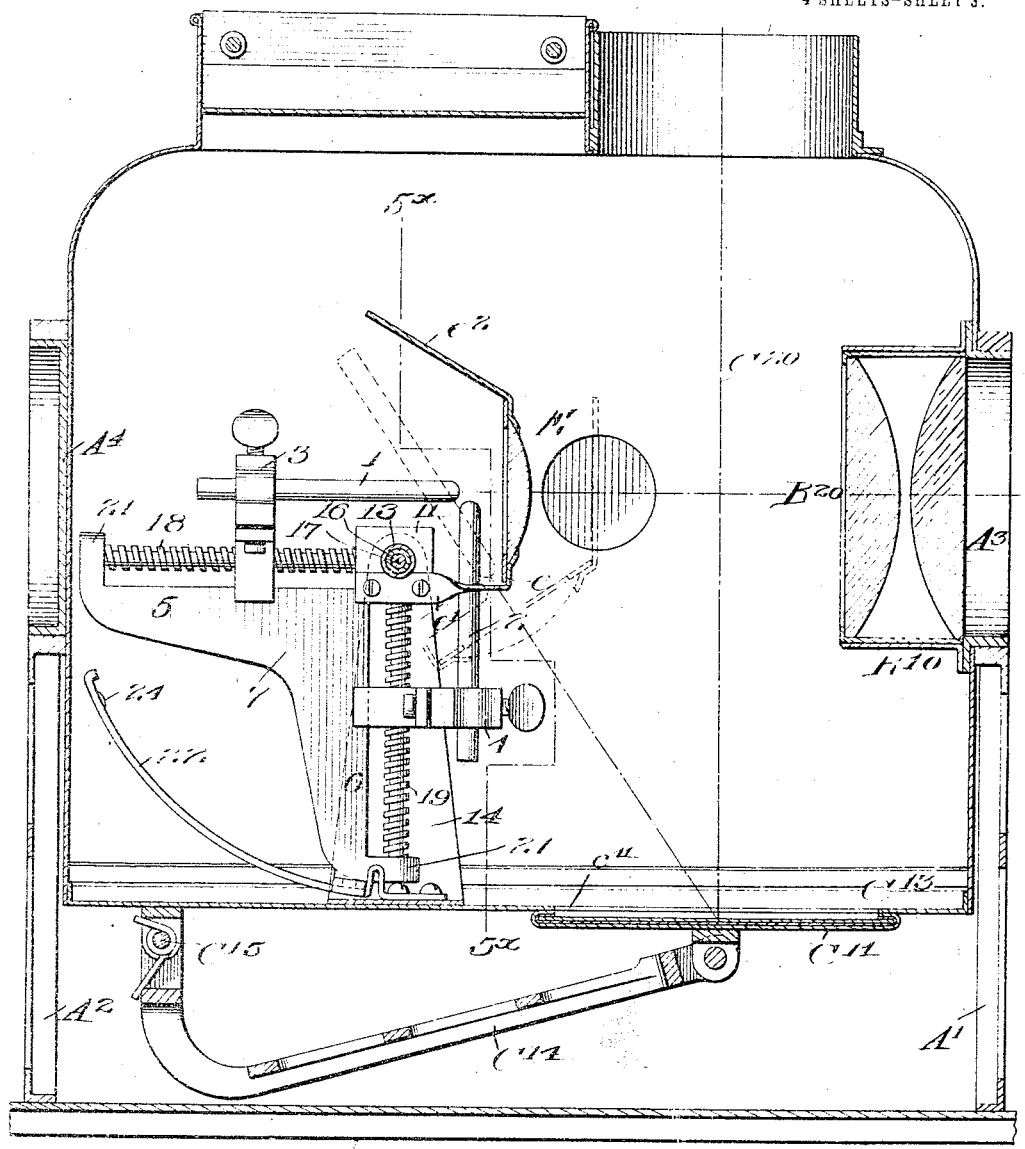

W. L. PATTERSON.
PROJECTION APPARATUS.
APPLICATION FILED MAR. 16, 1912.
1,134,154.
Patented Apr. 6, 1915.
4 SHEETS—SHEET 1.
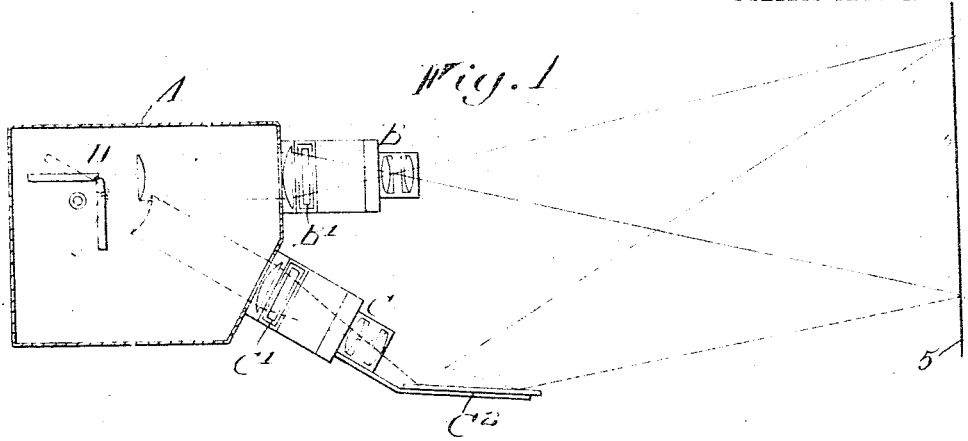
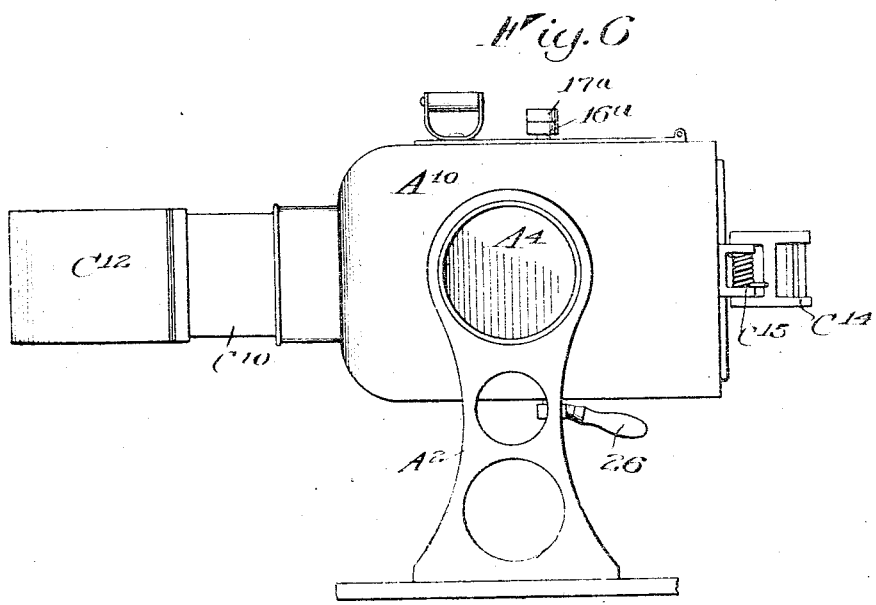
Inventor
William L. Patterson
Witnesses W. L. PATTERSON.
PROJECTION APPARATUS.
APPLICATION FILED MAR. 16, 1912.
1,134,154.
Patented Apr. 6, 1915.
4 SHEETS—SHEET 2.
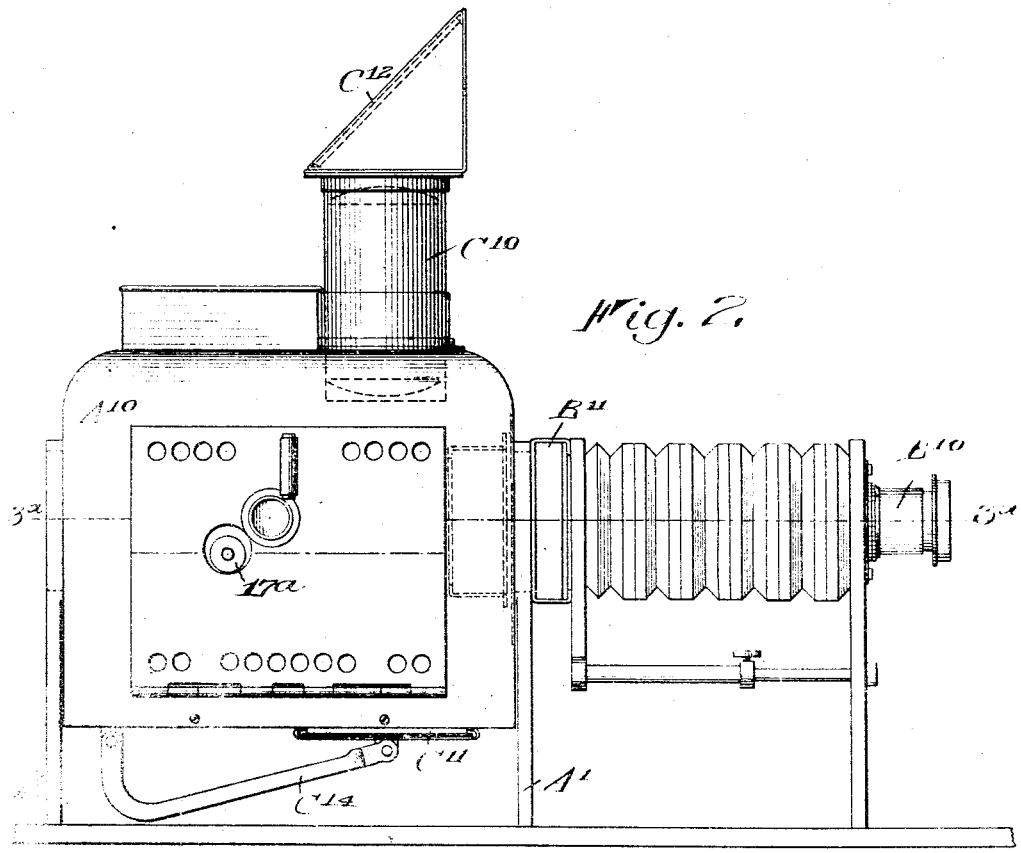
Witnesses
Inventor
William L. Patterson
By
Attorneys W. L. PATTERSON.
PROJECTION APPARATUS.
APPLICATION FILED MAR. 16, 1912.
1,134,154.
Patented Apr. 6, 1915.
4 SHEETS—SHEET 1.
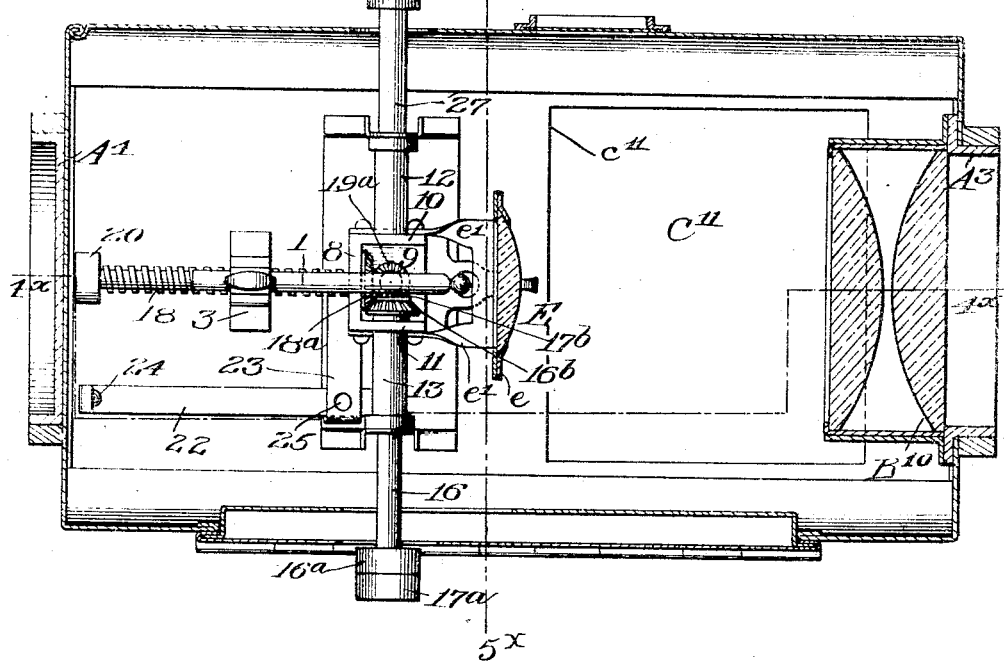
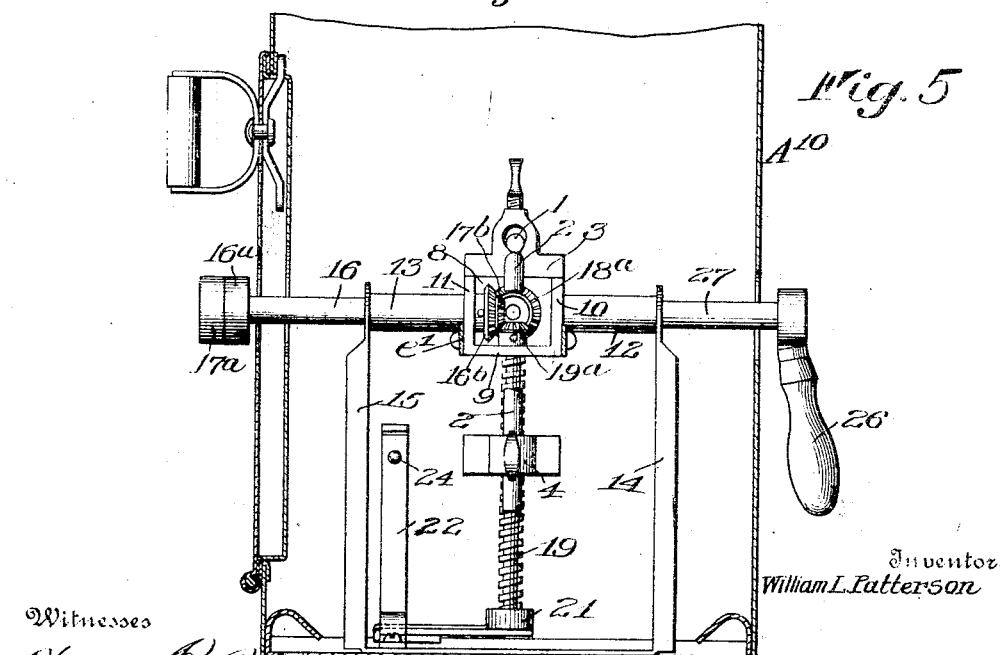
Witnesses
Walter B. Payne
Nelson H. Copp
Inventor
William L. Patterson
By Church & Rich
Attorneys

UNITED STATES PATENT OFFICE.

WILLIAM L. PATTERSON, OF ROCHESTER, NEW YORK, ASSIGNOR TO BAUSCH AND LOMB OPTICAL COMPANY, OF ROCHESTER, NEW YORK, A CORPORATION OF NEW YORK.

PROJECTION APPARATUS.

1,134,154.  Specification of Letters Patent.  Patented Apr. 6, 1915.

Application filed March 16, 1912.  Serial No. 684,153.

*To all whom it may concern:*

Be it known that I, WILLIAM L. PATTERSON, of Rochester, in the county of Monroe and State of New York, have invented certain new and useful Improvements in Projection Apparatus; and I do hereby declare the following to be a full, clear, and exact description of the same, reference being had to the accompanying drawings, forming a part of this specification, and to the reference-numerals marked thereon.

My present invention has for its object to provide an apparatus having a plurality of systems of projecting lenses and a single lamp or illuminant which is capable of adjustment to illuminate one or another of said lens systems independently at the volition of the operator.

My invention further comprehends the arrangement with two different systems of projecting lenses, of an illuminating element located relatively to each of said lens systems and mounted upon an axis upon which it may be rotated to direct the rays of light emanating therefrom into either system of lenses whereby, by the mere adjustment of the illuminating element, images of transparent objects, or images of opaque objects may be alternately thrown upon the same or different focusing screens.

To these and other ends the invention consists in certain improvements and combinations of parts all as will be hereinafter more fully described, the novel features being pointed out in the claims at the end of the specification.

In the drawings: Figure 1 is a diagrammatic plan view of a projection apparatus showing one embodiment of my invention. Fig. 2 is a side elevation of a projecting apparatus embodying my invention and showing lens systems adapted to project images of transparencies and opaque objects. Fig. 3 is an enlarged horizontal sectional view showing the interior of the dark chamber of the apparatus, taken on the line 3×—3× of Fig. 2; Fig. 4 is a vertical sectional view taken on the line 4×—4× of Fig. 3, and Fig. 5 is a vertical sectional view taken on the line 5×—5× of Fig. 3, showing in front elevation the lamp element; Fig. 6 is a rear elevation of the apparatus shown in Fig. 2 with the opaque projecting system arranged horizontally.

Similar reference numerals in the several figures indicate the same parts.

In projection apparatus adapted for general use, the most desirable point to obtain, from the standpoint of efficiency and adaptability for the various purposes to which the user may desire to adapt the instrument, is the capability of the apparatus to successively project images of different objects without the necessity of changing the position of the instrument, and without the delay incident to the necessary adjustment of many of its parts.

The broad object of my present invention is to attain these ends and to provide a simple, compact apparatus suitable for use either for the more exacting requirements of scientific work, or the lesser demands made upon an instrument of this character when it is used for the mere exhibiting of pictures for the purpose of illustration and amusement.

In the illustration I have shown my invention in Fig. 1 in its simpler form as comprising a plurality of systems of lenses and a single source of illumination adjustably arranged to project objects or transparencies, such as lantern slides.

In Fig. 2, I have illustrated an apparatus containing these same elements disposed in such a manner that images of both transparent and opaque objects may be alternately projected and portrayed upon the same or different focusing screens.

In its simplest form my invention comprises the dark chamber inclosed by the casing A in the forward end of which is mounted two or more lens systems B and C disposed at an angle to each other so that their axes intersect within the casing. In rear of this point of intersection the lamp or illuminating element D is adjustably mounted in suitable bearings so that it may be rotated to project its rays of light along the optical axis of either system of lenses to illuminate the lantern slides or other transparent objects inserted in one or the other of the holders B'—C' and to project the images thereof onto the screens arranged in alinement with one of the lens systems. It will be understood that when the operator requires the full effective power of the light from both lens systems he will employ separate focusing screens for each. However, under ordinary circumstances one such screen is sufficient and the light rays from one system of lenses may be bent by a deflector $C^2$ into the field of the light rays from the other lens system. The details of lamp structure by means of which it is movably mounted are shown in Figs. 3, 4 and 5 and their arrangement and operation will be fully described in connection with the form of apparatus I have shown for carrying out my invention as applied also to a combined transparent and opaque projector.

In a projection apparatus for displaying images upon a screen of transparencies and images of opaque objects I employ two lens systems $B^{10}$ and $C^{10}$, the former extending horizontally from the dark chamber casing $A^{10}$ for the projection of direct rays of light which also pass through the object holder $B^{11}$. The other lens system $C^{10}$ preferably extends at a right angle to the lens system $B^{10}$ and also preferably projects from the top side or wall of the dark chamber and is illuminated by the light rays reflected into it by the object, an image of which is to be projected, located relatively to said lens systems and the source of illumination and which may be held in this position by a holder $C^{11}$. The rays of light emitted from the opaque projection system of lenses may be deflected by a polished surface or mirror $C^{12}$ located at such an angle that the light rays therefrom will fall in the focal plane of those of the lens system $B^{10}$.

The optical axes of the two lens systems $B^{10}$ and $C^{10}$ intersect as indicated by the dot and dash lines $B^{20}$ and $C^{20}$, Fig. 4, and in the plane of these axial lines, situated in rear of their point of intersection, is the illuminating element or lamp. The light emanating from the latter may be generated in any desired manner, although I prefer, where the circumstances will permit, to employ an electric arc lamp having the carbons indicated by 1 and 2, adjustably mounted in holders 3 and 4, which are each capable of movement to facilitate positioning the meeting ends of said carbons. The latter are preferably arranged at an angle of 90° to each other, and the holders 3 and 4 are guided on the edges 5 and 6 of an angular shaped web 7 carried on a box shaped frame piece located at the meeting point of the surfaces 5 and 6. This box comprises a rear wall 8, a bottom wall 9 and two side walls 10 and 11, the two latter being provided with outwardly extending trunnions 12 and 13 carried in journals on the upwardly extending arms 14 and 15 of a U-shaped frame piece attached to the bottom of the dark chamber. One of the trunnions is hollow and rotating therein is the tubular shaft 16 within which is arranged another shaft 17, both of which project exteriorly of the dark chamber A where they are provided, respectively, with operating knobs $16^a$ and $17^a$. At their inner extremities within the frame box these shafts are provided with bevel gear wheels $16^b$ and $17^b$. By means of the independent rotation of the shafts 16 and 17, the lamp carbons 1 and 2 may be conveniently adjusted, the means employed for operating them comprising the screws 18 and 19 threaded in the holders 3 and 4. The screw 18 is journaled at one end in the wall 8 of the box and at its opposite extremity, in the ear 20, on the web 7, while the screw 19 is similarly journaled in the wall 9 of the box and the ear or extension 21 of the web 7. The shafts 18 and 19 are provided respectively with bevel gear wheels $18^a$, $19^a$, the former coöperating with the gear wheel $16^b$ and the latter with the gear wheel $17^b$. The matter of providing the two adjusting shafts in the pivotal point of lamp frame is important in that adjustments of the lamp may be effected in any position which the lamp may occupy and further the rotation of lamp will not in any way vary the adjustment of said parts. Also supported on the frame which carries the illuminating element is a condenser lens E mounted in the holder $e$, having the rearwardly extending arms $e'$ attached to the lamp frame and also provided with the rearwardly projecting top flange $e^2$, for a purpose which will further be described.

Arranged concentrically to the axis of movement of the lamp is a spring rail 22 against which bears a finger 23 projecting laterally from the bottom of the frame piece 7, the rail 22 and the finger 23 having coöperating projections and depressions, as indicated by 24 and 25, which engage at the limits of the swinging movement of the lamp frame to secure it in either of the two positions shown by full and dotted lines in Fig. 4, said lamp being rotated a partial revolution by any suitable means accessible from the exterior of the casing, such as a handle 26 attached to the shaft 27 extending outwardly from the trunnion 12.

The normal position of the lamp is that shown in Fig. 4, in which the light emanating from the arc formed between the carbons 1 and 2, passing through the condenser E and the object arranged in the holder $B^{11}$, enters the lens system $B^{10}$ and is projected thereby directly upon the screen.

Opaque objects, as above explained, are located in proper position in the axis of the lens system $C^{10}$ where they may be supported in any desired manner, or secured by a holder $C^{11}$ normally covering the exposure aperture $c^{11}$ in the casing against which the object may be held by the spring operated arm $C^{14}$ pivoted at $C^{15}$ to the dark chamber $A^{10}$.

When it is desired to project images of objects, located at the opaque object exposure aperture $C^{13}$, the illuminating element is rotated upon its support by means of the handle 26 until it is adjusted in such a position that the rays of light are focused directly upon said object, at which time the parts of the lamp are in the position shown in dotted lines in Fig. 4. The lamp being arranged in rear of the axis $C^{20}$ of the lens system $C^{10}$ does not intercept any part of the beam of light reflected into said lens system, and the shield or guard $e^2$ being at this time in alinement with the axis $B^{20}$ of the lens system $B^{10}$, the indirect light rays are intercepted and prevented from entering this system of lenses at this time.

Considerable advantage is obtained, especially in the projection of images of some classes of articles if such articles can be maintained in a vertical plane, and as a further object of my invention, I mount the dark chamber $A^{10}$ so that it may be rotated from its normal position shown in the various figures, into the position shown in Fig. 6. As a simple means of permitting this adjustment, the dark chamber is supported independently of the lens system $B^{10}$, upon uprights or standards $A^1$, $A^2$, on the base which are provided at their upper ends with large journal apertures receiving the collars $A^3$, $A^4$ arranged on the forward and rear ends of the dark chamber. These collars are secured to the latter centrally of the axis $B^{20}$ of the lens $B^{10}$, and the interior diameter of the collar $A^3$ is sufficiently large to permit the rays of light to pass unobstructed to the lens system $B^{10}$.

A projecting apparatus embodying my invention is simple in construction and comprises few parts which may be easily manufactured and assembled.

The adjustability of the lamp within the dark chamber so that it may be used to serve a plurality of lens systems obviates the use of the second lamp customarily employed and the attendant difficulty in maintaining it in proper adjustment.

The revolubility of the dark chamber casing as a whole with the opaque projection lens system and the lamp I also deem important as this permits images of objects to be displayed which must be maintained in a vertical position and the lamp moving with said lens system and its axis of adjustment being maintained in respect to the transparent projection lens system it may be alternately used to illuminate either of said lenses irrespective of the rotary position of the dark chamber casing.

I claim as my invention:

1. In a projecting apparatus, the combination with a casing and means supporting it for rotation on a horizontal axis, of a lens system located in said axis, a second lens system arranged at an angle thereto, and a source of illumination for said lenses carried bodily by the casing and adjustable therein.

2. In a projecting apparatus, the combination with a dark chamber casing, means supporting it for rotation about a horizontal axis and a lens system located in front of the casing, of a second lens system arranged on one of the sides of the casing, an object holder mounted on the opposite side of the casing and a source of illumination movably supported within and rotating with the casing and adjustable to direct the rays of light emanating therefrom into the first mentioned lens system or onto said object holder in all positions of adjustment of the casing.

3. In a projection apparatus, the combination with two systems of lenses disposed so that their optical axes intersect, of a pivotally mounted lamp movable relatively to both of said lens systems to alternately illuminate them, and a light shield movable with the lamp and positioned to intercept the lateral rays of light and prevent their passing into the lens system which is not being illuminated.

4. In a projection apparatus, the combination with two lens systems and a rotatable lamp adapted to be adjusted into different positions to illuminate either lens system, of a movable shield adapted to be adjusted into positions relatively to said lens systems to prevent the passage of lateral light rays indirectly into the lens system which is not being illuminated by the direct light rays.

5. In a projection apparatus, the combination with a plurality of lens systems and a rotatable lamp adapted to be adjusted into different positions to illuminate one or another of said lens systems, of a condenser carried on the lamp and a plate located above the condenser and arranged to occupy a position between the lamp and one of the lens systems in each position of adjustment of the lamp.

6. In a projecting apparatus, the combination with a plurality of lens systems, of a lamp for illuminating the lenses comprising relatively adjustable coöperating members, a pivotally mounted carrier supporting them and devices for adjusting said members extending through the pivot of the carrier.

7. In a projecting apparatus, the combination with a plurality of lens systems, of an adjustable lamp movable into different positions to illuminate one or another of said lenses comprising a pivoted frame, relatively adjustable members thereon, devices for adjusting them passing through the pivot of the frame and a handle for rotating the lamp frame.

8. In a projecting apparatus, the combination with a casing, a lamp frame pivotally supported within the casing, holders movable on the frame, carbons supported therein, devices for adjusting the holders, operable from the exterior of the casing and extending through the pivot of the frame, and an operating handle located outside of the casing and connected to the frame for shifting the lamp as a whole into and out of a position in which the rays of light produced between the ends of the carbons will be projected into the lens system.

9. In a projecting apparatus, the combination with a dark chamber casing, a lens system and a journal bearing within the casing, of a lamp frame journaled in the bearing, coöperating light producing members adjustably supported on the frame, shafts arranged axially of the frame for adjusting the members, and an axial projection extending exteriorly of the casing for swinging the frame to rotate the lamp as a whole.

10. In a projecting apparatus, the combination with a dark chamber casing, a lens system and separated journal bearings within the casing, of a lamp frame having a hollow trunnion supported in one bearing and a second trunnion extending through the other bearing to the exterior of the casing, light producing members movably supported on the frame and concentric shafts for adjusting said members journaled in the hollow trunnion and projecting exteriorly of the casing.

WILLIAM L. PATTERSON.

Witnesses:
WILLIAM G. WOODWORTH,
HENRY C. THON.